United States Patent [19]

Kok et al.

[11] 4,108,958
[45] Aug. 22, 1978

[54] EXTRACTION OF CU(II), FE(III), NI(II), CO(II), CD(II), ZN(II), CA(II) AND MG(II) METAL VALUES USING 2-HYDROXY IMINOACETIC ACIDS

[75] Inventors: Riekert Kok; Abraham J. van der Zeeuw, both of Amsterdam, Netherlands

[73] Assignee: Shell Oil Company, Houston, Tex.

[21] Appl. No.: 816,108

[22] Filed: Jul. 15, 1977

Related U.S. Application Data

[62] Division of Ser. No. 723,115, Sep. 14, 1976, abandoned.

[30] Foreign Application Priority Data

Sep. 18, 1975 [GB] United Kingdom ............... 38379/75

[51] Int. Cl.$^2$ .................. C01G 3/00; C01G 9/00; C01G 51/00; C01G 53/00
[52] U.S. Cl. ...................................... 423/24; 423/100; 423/139; 423/157; 75/101 BE; 260/518 R
[58] Field of Search ............. 260/518 R; 423/24, 100, 423/139, DIG. 14, 157; 75/101 BE

[56] References Cited

U.S. PATENT DOCUMENTS

| 3,251,646 | 5/1966 | Alon et al. ............................. 423/24 |
| 3,649,219 | 3/1972 | Lynn et al. ............................ 423/157 |

FOREIGN PATENT DOCUMENTS

1,399,089 6/1975 United Kingdom ............... 260/518 R

OTHER PUBLICATIONS

Stary, J., *The Solvent Extraction of Metal Chelates*, Pergamon Press, Oxford, Eng., (1964), pp. 39, 40.

*Primary Examiner*—Brian Hearn

[57] ABSTRACT

Novel 2-hydroxyiminoacetic acids of the formula

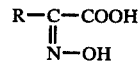

where R is an aromatic hydrocarbyl group substituted with one or more aliphatic chains of at least four carbon atoms are excellent for the extraction of metal values from acidic metal - containing aqueous solutions, particularly for the separation of Cu from Fe, Ni from Co and Ca from Mg.

6 Claims, 1 Drawing Figure

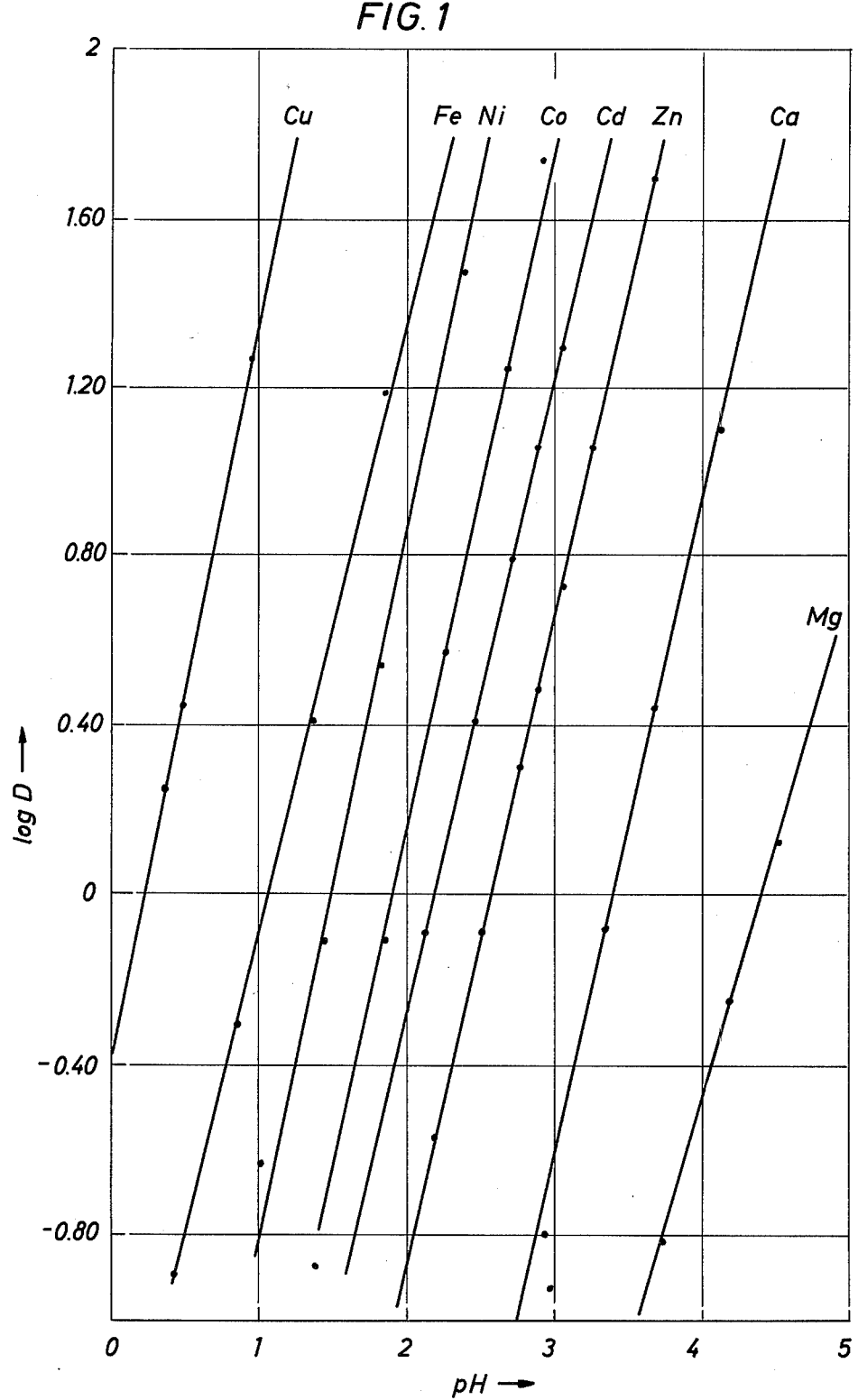

EXTRACTION OF CU(II), FE(III), NI(II), CO(II), CD(II), ZN(II), CA(II) AND MG(II) METAL VALUES USING 2-HYDROXY IMINOACETIC ACIDS

This is a division of application Ser. No. 723,115, filed Sept. 14, 1976, now abandoned.

BACKGROUND OF THE INVENTION

1. Field of the Invention

The invention relates to novel 2-alkylaryl 2-hydroxyiminoacetic acids as well as to a process for their preparation. The 2-hydroxyiminoacetic acids according to the present invention have outstanding properties as metal-extraction agents. The invention therefore also relates to a process for the extraction of metal values with the aid of these 2-hydroxyiminoacetic acids.

2. Description of the Prior Art

One of the processes used for the production of metals from ores comprises grinding the ore and extracting the ground ore with an aqueous solution containing sulphuric acid. The acidic aqueous extract phase thus obtained usually contains a mixture of metal ions. An alkaline material, for example, aqueous ammonia, is added to this extract phase to increase the pH to a value suitable for the selective liquid-liquid extraction of one of the metal values with an extractant comprising an organic solvent and a dissolved organic extraction agent. This organic extraction agent is more soluble in the organic solvent that in water and forms complexes with the metals to be extracted. These complexes are also more soluble in the organic solvent than in water.

The liquid-liquid extraction can be conducted continuously by bringing the acidic aqueous solution into contact with the extractant, preferably by vigorous stirring. Then, the organic phase is separated from the aqueous phase and stripped with an aqueous solution containing a strong mineral acid. The metal values are thus transferred to the aqueous stripping solution as metal salts and can then be recovered therefrom, for example, by crystallization, or as metal by electrolysis, while the organic phase containing the released organic extraction agent is advantageously used again for the extraction of further quantities of metal values.

Organic extraction agents are described in:

(1) U.S. Pat. No. 3,224,873, disclosing the use, as copper-extraction agent, of alpha-hydroxy-oximes of the general formula

wherein $R_1$, $R_2$ and $R_3$ can represent any of a variety of organic radicals such as aliphatic and alkylaryl radicals, while $R_3$ may also represent a hydrogen atom. Table I in the above-named specification shows that at a pH of 2.63, 3.0% of the copper was extracted from the acidic aqueous solution, the logarithm of the distribution coefficient being −1.66.

(2) U.S. Pat. No. 3,428,499, disclosing the use, as copper-extraction agent, of 2-hydroxybenzophenone oximes substituted with (a) saturated or ethylenically unsaturated aliphatic group or groups or the corresponding ether group or groups, in combination with alpha-hydroxy-oximes of the general formula I. The acidic aqueous starting solutions in this case usually have a pH between 1.4 and 2.3. For example, the logarithm of the distribution coefficient for copper at a pH of 1.68 has a value of −0.28.

(3) British Pat. specification No. 1,322,532 disclosing the use, as metal-extraction agent, of a hydroxy-oxime of the general formula

in which $R^4$ represents an aliphatic group and A a cyclic organic group carrying as substituents at least a hydroxyl group at a ring carbon atom in a 2-position — the number 1 being assigned to the ring carbon atom to which the —C(=NOH)—R group is attached — and an organic group. These extraction agents are suitably used for copper extraction from aqueous solutions having a pH between 1 and 1.5 and those in which the group A contains, in addition, one or more electron-attracting substituents, from aqueous solutions having a pH between 0 and 1. For example, for a representative oxime the logarithm of the distribution coefficient for copper at a pH of 1.04 has a value of 0.14. The oximes of the general formula II cannot be used for the separation of nickel (II) from cobalt (II), because the complexes of cobalt are difficult to decompose.

(4) German Offenlegungsschrift No. 2,234,901, discloses the use, as metal-extraction agent, of certain salicylaldoximes. The acidic aqueous solutions used in Examples 1 and 3 of this publication had a pH of 2 and 1.49, respectively. From the results obtained logarithms of distribution coefficients for copper of 0.14 and −0.1, respectively, can be calculated.

(5) British Pat. specification No. 959,813, disclosing the use of certain alkanemonocarboxylic acids for the separation of nickel from cobalt present in aqueous solutions having a pH between 7.5 and 9.5; copper is advantageously extracted from aqueous solutions having a pH between 5 and 6.

The rate of extraction attained with the organic extraction agents mentioned under (1), (2), (3), and (4) is too low to justify their application in a column contactor such as a rotating disc contactor (disclosed in British Pat. specification No. 659,241). They call for the use of an impeller mixer. The rate of extraction attained with the organic extraction agents mentioned under (5) is sufficiently high to justify their application in a column contactor, but they cannot be used for the separation of nickel from cobalt present in acidic aqueous solutions.

The present invention provides novel metal-extraction agents, the advantages of which are illustrated hereinafter.

SUMMARY OF THE INVENTION

Novel 2-alkylaryl-2-hydroxyiminoacetic acids are those having the formula

where R is an aryl group substituted with one or more aliphatic chains, the chains having in total at least four carbon atoms. The 2-alkylaryl-2-hydroxyiminoacetic acids can be used in a process for extracting metal values from an aqueous acid solution at a temperature of between about 0° and about 50° C where an acidic aqueous solution and an extractant are in the ratio of from about 1:5 to about 5:1, where the extractant is made up of an organic solvent which has a mutual miscibility with the acidic aqueous layer not in excess of 5 volume percent (%v) and the 2-alkylaryl-2-hydroxyiminoacetic acid, and where the concentration of acid in the organic solvent is between about 0.01 and about 1.0 mol/liter. The organic layer containing the complexed metal is separated and the metal extracted from the organic layer using a mineral acid.

DESCRIPTION OF THE PREFERRED EMBODIMENTS

The novel compounds according to the present invention are 2-hydroxyiminoacetic acids of the general formula

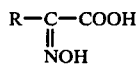  (III)

and their salts, in which formula R represents an aromatic hydrocarbyl group substituted with one or more, preferably 1 to 3, most preferably 1, aliphatic side chain(s) possessing in total at least four carbon atoms. (By hydrocarbyl it is meant that the aromatic moiety contains only hydrogen and carbon and some of the hydrogens have been replaced as indicated by the

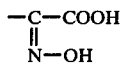

and aliphatic chains.)

The aromatic hydrocarbyl group in the general formula III may be polycyclic but is preferably monocyclic. The aliphatic side chain(s) may contain heteroatoms, for example, an oxygen atom. In particular, R represents an alkyl-substituted monocyclic 6 carbon aromatic hydrocarbyl group, the alkyl group or groups possessing in total at least 4 carbon atoms preferably between 4 and 25 carbon atoms and most preferably between 7 and 20 carbon atoms inclusive. An example of particularly preferred 2-hydroxyiminoacetic acids according to the invention is a mixture of isomeric 2-(p-dodecylphenyl)-2-hydroxyiminoacetic acids, of which the isomerism is caused by the branching of the dodecyl groups which are derived from a mixture of branched dodecenes obtained by oligomerization of propene. Other examples of groups represented by R are 2,4-diisopropylphenyl, p-n-hexylphenyl, p-2-methylheptylphenyl, p-n-heptylphenyl, p-2-methyloctyl, p-n-nonylphenyl, p-2-methylnonylphenyl, p-n-decylphenyl, p-2-methyldecylphenyl, p-n-tridecylphenyl, p-2-methyltridecylphenyl, p-n-tetradecylphenyl, p-n-hexadecylphenyl and p-n-eicosylphenyl groups. A mixture of isomeric 2-(p-nonylphenyl)-2-hydroxyiminoacetic acids, of which the isomerism is caused by the branching of the nonyl groups, which are derived from a mixture of branched nonenes obtained by trimerization of propene, is also within the scope of the invention. The preferred R groups are the p-dodecylphenyl and p-nonylphenyl group or mixtures thereof where the alkyl chain is branched.

The 2-hydroxyiminoacetic acids of the general formula III may be prepared by methods known in the art.

A suitable route to alkali metal salts of 2-hydroxyiminoacetic acids of the general formula III, wherein R represents a p-alkylphenyl, an o-alkylphenyl or an o,p-dialkylphenyl group, includes reacting the corresponding alkylbenzene or 1,3-dialkylbenzene (compounds according to formula III, modified by replacing the HOOC—C=NOH group by a hydrogen atom) with methoxalyl chloride (where methoxalyl chloride is CH₃OCOCOCl) in the presence of a Friedel Craft type catalyst and reacting the methyl 2-oxo-2-(p-alkylphenyl)acetate, methyl 2-oxo-2-(o-alkylphenyl)acetate or methyl 2-oxo-2-(2,4-dialkylphenyl)acetate thus obtained with hydroxylamine and alkali metal hydroxide. The alkali metal salts thus formed may be converted into the corresponding 2-hydroxyiminoacetic acids by acidification of a solution thereof with a mineral acid such as sulfuric acid or hydrochloric acid.

The invention further relates to a process for the separation of metal values from an acidic aqueous solution thereof by liquid-liquid extraction with an extractant comprising an organic solvent and, dissolved therein, a 2-hydroxyiminoacetic acid of the general formula

wherein R represents an aromatic hydrocarbyl group substituted with one or more aliphatic side chains possessing in total at least four carbon atoms.

The process for the separation of metal values according to the present invention allows the use of acidic aqueous starting solutions having an unusually low pH. This reduces the quantity of alkaline agent required to increase the pH of the acidic solution to be extracted. Furthermore, in most cases the protons liberated during the extraction need not be neutralized. In general the pH can vary between about 0 and about 5, preferably between about 1.0 and about 4.5.

The process for the separation of metal values according to the invention is preferably conducted with 2-hydroxyiminoacetic acids of the general formula III, wherein R represents an alkyl-substituted monocyclic aromatic hydrocarbyl group. The aliphatic side chains in the general formula III must have in total at least four carbon atoms, because with decreasing number of carbon atoms in the side chain the 2-hydroxyiminoacetic acids become more soluble in water and less soluble in organic solvents. Preferred aliphatic side chains have in total between about 4 and about 25 carbon atoms, most preferably between 7 and 20 carbon atoms, inclusive. No additional advantages are obtained when the number of carbon atoms in the aliphatic side chain(s) increase above 25. Examples of suitable and preferred 2-alkylaryl-2-hydroxyiminoacetic acids are stated hereinbefore, the same applying to the extraction process.

The extraction according to the invention is so rapid that it may be conducted in a column contactor such as a rotating disc contactor as disclosed in British Pat. specification No. 659,241. The process is very suitable for the selective extraction of: (a) copper (II) values from an aqueous solution having a pH between about 0 and about 1.5 and containing copper (II) and iron (III) values; (b) nickel (II) values from an aqueous solution having a pH between about 1.0 and about 2.5 and containing nickel (II) and cobalt (II) values; the complexes of cobalt (II) can be decomposed with a mineral acid and, moreover, this separation is more selective than that effected with the alkanemonocarboxylic acids mentioned hereinbefore. (c) calcium values from an aqueous solution having a pH between about 3.0 and about 4.5 and containing calcium and magnesium values; such solutions become available, for example, when dolomite is dissolved in aqueous acid.

Preferably, the mutual miscibility of the acidic aqueous solution and the organic solvent should not exceed 5%v, and in particular it should be lower than 1%v. Suitable solvents are, for example, halogenated solvents, such as chloroform, 1,2-dichloroethane, 1,2-dichloropropane, 1,2,3-trichloropropane and di(2-chloroethyl)ether, and in particular hydrocarbons, for example, kerosine, toluene and the xylenes.

A favorable volume ratio of the extractant to the acidic aqueous solution has been found to be 1:5 to 5:1, preferably 1:3 to 3:1. However, ratios outside this range may also be used. As a rule, the extraction proceeds smoothly at a temperature between about 0° and about 50° C preferably between about 15° C and about 35° C. The concentration of 2-alkylaryl-2-hydroxyiminoacetic acid in the organic solvent is between about 0.01 and about 1.0 moles per liter, preferably between about 0.05 and about 0.5, most preferably between about 0.1 and about 0.3.

The extractant may contain a compound favoring phase separation, for example, a long-chain alcohol such as a mixture of primary alkanols having from nine to eleven carbon atoms per molecule, of which at least 80% are linear; such mixtures are known under the trade name of "LINEVOL." Other examples of such compounds are hexanol, octanol, 2-methyldecanol, tridecanol and alkylphenols possessing alkyl groups having at least six carbon atoms, for example, p-nonylphenol and p-dodecylphenol.

In general, the process is performed by contacting the acidic aqueous solution of metal values with a solution of the 2-alkylaryl-2-hydroxyiminoacetic acid in the organic solvent, separating the layers and extracting the metal ions from the organic layer with a mineral acid solution. Equivalent procedures will be recognized, such as adding the 2-hydroxyiminoacetic acid or a salt thereof to the acidic aqueous layer containing the metal values, then adding the organic solvent. Alternate methods of recovering the metal-hydroxyiminoacetic acid complex are possible such as crystallization or distillation.

The process separates Cu from Fe at between about 0.0 and about 1.0 pH, Ni from Co at between about 1.0 and about 2.5 pH and Co from Mg at between about 3 and about 4.5 pH.

The invention is further illustrated by means of the following Illustrative Embodiment. This Illustrative Embodiment is for illustration only and should not be interpreted to limit the scope of the invention.

ILLUSTRATIVE EMBODIMENT I

A. Preparation of 2-(o-and p-dodecylphenyl)-2-hydroxyiminoacetic acid

A flask was charged with 0.1 mol of a mixture of isomeric dodecylbenzenes, 0.1 mol of methoxalyl chloride and 100 ml of tetrachloroethylene. The dodecylbenzenes had been prepared by alkylation of benzene with a mixture of branched dodecenes obtained by oligomerization of propylene. The contents of the flask were kept at a temperature between 0° and 10° C and 0.15 mol of powdered aluminum chloride was added with stirring. Then, the temperature of the contents of the flask was increased to 40° C and stirring was continued at this temperature for a period of two hours. The reaction product thus formed was poured into 100 ml of 1N aqueous sulfuric acid, the aqueous phase was separated from the organic phase thus formed and the latter phase was washed twice with 100 ml of 1N aqueous sulfuric acid. The washed organic phase was boiled down at a pressure of 0.047 bar and the residue formed was dissolved in 50 ml of ethanol. An amount of 0.1 mol of hydroxylamine hydrochloride and 0.2 mol of solid sodium hydroxide and 50 ml of water were added to the ethanolic solution formed and the solution was boiled under reflux for a period of 2 hours. Then, the reaction mixture was extracted twice with 50 ml of n-pentane and the raffinate phase obtained was acidified with 60 ml of 2N aqueous sulfuric acid, the acidified mixture was extracted three times with 50 ml of n-pentane, the extract phases obtained were combined and the combined phases were dried in the presence of anhydrous sodium sulfate and then boiled down at a pressure of 0.047 bar and a temperature of 50° C to give a residue containing a mixture of isomeric 2-(o- and p-dodecylphenyl)-2-hydroxyiminoacetic acids, of which the isomerism is caused by the branching of the dodecyl groups. The residue was dried in a dessicator with anhydrous phosphorus pentoxide. Table I presents the results of an elementary analysis of the dried residue. The theoretical composition refers to the acid.

TABLE I

|   | Composition, % | |
|---|---|---|
|   | theoretical | found |
| C | 72.1 | 72.1 |
| N | 4.2 | 4.1 |
| H | 9.3 | 9.5 |
| O | 14.4 | 14.3 |

The dried residue had an acid number of 159 mg KOH/g (theory 168) and the amount of it corresponded to a yield of 83%, calculated as residue on dodecylbenzene. The dried residue mainly consisted of 2-(p-dodecylphenyl)-2-hydroxyiminoacetic acid, a minor content of 2-(o-dodecylphenyl)-2-hydroxyiminoacetic acid being present.

B. Extraction with 2-(o- and p-dodecylphenyl)-2-hydroxyiminoacetic acid

The extraction experiments were conducted in a separatory funnel consisting of a graduated, straight-walled vessel with a capacity of 0.25 liter. At the bottom a stopcock was provided for draining the funnel. The top opening was used to introduce a double-paddle stirrer and it also served as the inlet for the feed. The extractions were carried out by contacting 100 ml of an aqueous solution for a period of 15 seconds with 100 ml of an organic extraction solution and stirring at a rate of about 500 rev/min. The aqueous solutions contained metal sulfate or chloride in a concentration of 0.01 grams of metal per liter together with sodium sulfate or sodium chloride in a concentration of 0.5 mol per liter and sulfuric of hydrochloric acid. The organic extraction solution consisted of a mixture of a kerosine fraction, poor in aromatics, having an atmospheric boiling range from 210° to 240° C (90 %v) and primary alkanols having nine to eleven carbon atoms per molecule of which at least 80% was linear (10%v) and the 2-(o- and p-dodecylphenyl)-2-hydroximinoacetic acid prepared as described above in a concentration of 0.1 mol/liter.

Each aqueous solution contained one metal to be extracted. Eight starting solutions were prepared which contained $Cu^{++}$, $Fe^{+++}$, $Ni^{++}$, $Co^{++}$, $Cd^{++}$, $Zn^{++}$ (these six were obtained by dissolving the metal sulfate), $Ca^{++}$ and $Mg^{++}$ (these two were obtained by dissolving the metal chloride). The first six solutions contained sodium sulfate, the last two sodium chloride. The pH of the starting aqueous solutions was adjusted by adding sulfuric acid (for the first six metals) or hydrochloric acid (for the last two metals) and the extraction was started. Then, the two phases were allowed to separate and the concentrations of the metal in the organic and in the aqueous phase were determined. Subsequently, the pH of the aqueous solution was slightly increased by adding 25%w aqueous ammonia and stirring was continued until equilibrium was again obtained. The two phases were allowed to separate and the concentrations of the metal in the organic and in the aqueous phase were again determined. This procedure was continued in this way for each of the eight metals. Table II presents the logarithms of the distribution coefficients D found at various pH values. The distribution coefficient is the quotient of the concentrations of the metal in the organic and the aqueous phase.

BRIEF DESCRIPTION OF THE DRAWING

In the Drawing (FIG. 1) the pH and the log D have been set out along the horizontal and vertical axes, respectively. The values for log D and the pH presented in Table II have been plotted in the graph and are indicated with points. A straight line has been drawn through each set of points thus obtained for one particular metal.

TABLE II

| Cu | | Fe | | Ni | | Co | |
|---|---|---|---|---|---|---|---|
| pH | log D | pH | log D | pH | log D | pH | log D |
| 0.38 | 0.27 | 0.48 | −0.88 | 1.04 | −0.61 | 1.56 | −0.85 |
| 0.55 | 0.46 | 0.92 | −0.30 | 1.50 | −0.18 | 1.90 | −0.09 |
| 1.04 | 1.28 | 1.42 | 0.24 | 1.97 | 0.48 | 2.36 | 0.59 |
| 1.52 | 2.15 | 1.90 | 1.20 | 2.46 | 1.48 | 2.76 | 1.26 |
| 1.98 | 3.07 | | | 2.87 | 2.23 | 3.04 | 1.75 |

| Cd | | Zn | | Ca | | Mg | |
|---|---|---|---|---|---|---|---|
| pH | log D | pH | log D | pH | log D | pH | log D |
| 2.20 | −0.08 | 2.20 | −0.55 | 2.98 | −0.80 | 3.37 | −1.3 |
| 2.52 | 0.43 | 2.52 | −0.07 | 3.37 | −0.08 | 3.74 | −0.80 |
| 2.80 | 0.80 | 2.80 | 0.32 | 3.74 | 0.47 | 4.22 | −0.24 |
| 2.97 | 1.06 | 2.97 | 0.50 | 4.22 | 1.1 | 4.60 | 0.13 |
| 3.14 | 1.29 | 3.14 | 0.74 | 4.60 | 2.6 | | |
| 3.37 | 1.58 | 3.37 | 1.05 | | | | |
| | | 3.78 | 1.7 | | | | |

ILLUSTRATIVE EMBODIMENT II

A. Preparation of 2-(2,4-disiopropylphenyl)-2-hydroxyiminoacetic acid

The experiment described in Illustrative Embodiment I, Section A, was repeated with 30g (0.18 mol) of 1,3-diisopropylbenzene (which also contained max 5 percent by weight (%w) of 1,3,5-triisopropylbenzene) instead of the mixture of isomeric dodecylbenzenes. The dried residue had an acid number of 135 mg KOH/g, indicating that 60%w consisted of hydroxyiminoacetic acid (calculated as diisopropyl derivative) and 40%w of unconverted starting 1,3-diisopropylbenzene. The yield was 84%, calculated as 2-(2,4-diisopropylphenyl)-2-hydroxyiminoacetic acid on methoxalyl chloride.

B. Extraction with 2-(2,4-diisopropylphenyl)-2-hydroxyiminoacetic acid

The extraction of copper described in Illustrative Embodiment I, Section B, was repeated with the modification that the 2-(o- and p-dodecylphenyl)-2-hydroxyiminoacetic acid was replaced by the 2-(2,4-diisopropylphenyl)-2-hydroxyiminoacetic acid prepared as described in Section A. The extract phase contained copper, but some of the 2-(2,4-diisopropylphenyl)-2-hydroxyiminoacetic acid had been transferred to the raffinate phase (aqueous phase), which had acquired a brownish color.

We claim as our invention:

1. In the process of selectively extracting at least one metal value of the group consisting of copper (II), iron (III), nickel (II), cobalt (II), cadmium (II), zinc (II), calcium (II) and magnesium (II) from an acidic aqueous medium using an organic solvent and a complexing agent at a pH between about 0.0 and about 4.5, separating organic and aqueous layers and extracting the metal ions from the organic layer with a mineral acid solution, the improvement which consists of using as the complexing agent a compound having the formula

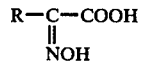

where R is an aryl group having between 1 and 3, inclusive, aliphatic groups attached thereto, where the total aliphatic carbons are at least 4.

2. The process of claim 1 wherein R is a monocyclic 6 member aromatic group attached to one aliphatic group containing from 7 to 20 carbon atoms, inclusive.

3. The process of claim 2 wherein the complexing agent is selected from the group consisting of 2-(p-nonylphenyl)-2-hydroxyaminoacetic acid, 2-(p-docylphenyl)-2hydroxyaminoacetic acid and mixtures thereof.

4. The process of claim 3 where the metal values consist of Ca (II) and Mg (II) and the pH is between about 3 and about 4.5.

5. The process of claim 3 where the metal values consist of Ni (II) and Co (II) and the pH is between about 1.0 and about 2.5.

6. The process of claim 3 wherein the metal values consist of Cu (II) and Fe (III) and the pH is between about 0.0 and about 1.0.

* * * * *